United States Patent
Sadaghiani et al.

(10) Patent No.: US 10,482,395 B2
(45) Date of Patent: *Nov. 19, 2019

(54) SYSTEM AND METHODS FOR DIGITAL ACCOUNT THREAT DETECTION

(71) Applicant: Sift Science, Inc., San Francisco, CA (US)

(72) Inventors: Fred Sadaghiani, San Francisco, CA (US); Keren Gu, San Francisco, CA (US); Alex Paino, San Francisco, CA (US); Jacob Burnim, San Francisco, CA (US); Thomas Schiavone, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,297

(22) Filed: Dec. 4, 2018

(65) Prior Publication Data

US 2019/0108334 A1 Apr. 11, 2019

Related U.S. Application Data

(63) Continuation of application No. 15/842,379, filed on Dec. 14, 2017, now Pat. No. 10,181,032.

(Continued)

(51) Int. Cl.
*H04L 9/00* (2006.01)
*G06N 20/00* (2019.01)
*G06F 21/55* (2013.01)
*G06N 3/08* (2006.01)
*G06F 21/57* (2013.01)
*G06F 21/31* (2013.01)

(Continued)

(52) U.S. Cl.
CPC ............. *G06N 20/00* (2019.01); *G06F 21/31* (2013.01); *G06F 21/552* (2013.01); *G06F 21/554* (2013.01); *G06F 21/577* (2013.01); *G06N 3/08* (2013.01); *G06F 17/50* (2013.01); *G06F 2221/034* (2013.01); *G06N 7/005* (2013.01)

(58) Field of Classification Search
USPC .......................................................... 726/23
See application file for complete search history.

(56) References Cited

U.S. PATENT DOCUMENTS 9,092,782 B1 * 7/2015 Zaslavsky ............. G06F 21/577
9,779,236 B2 * 10/2017 Abrams ................. G06F 21/554

(Continued)

*Primary Examiner* — Christopher J Brown
(74) *Attorney, Agent, or Firm* — Jeffrey Schox; Padowith Alce

(57) ABSTRACT

Systems and methods include: collecting digital event data for the digital account; using a trained machine learning model to extract account takeover (ATO) risk features from the collected digital event data; evaluating the extracted ATO risk features of the collected digital event data of the digital account against a plurality of ATO risk heuristics; identifying one or more of the plurality of ATO risk heuristics that is triggered by the extracted ATO risk features, wherein one or more of the plurality of ATO risk heuristics may be triggered if at least a subset of the extracted ATO risk features matches requirements of the one or more ATO risk heuristics; and generating an ATO risk assessment for the digital account using the one or more triggered ATO risk heuristics.

20 Claims, 6 Drawing Sheets

Related U.S. Application Data

(60) Provisional application No. 62/533,564, filed on Jul. 17, 2017, provisional application No. 62/543,952, filed on Aug. 10, 2017.

(51) Int. Cl.
*G06F 17/50* (2006.01)
*G06N 7/00* (2006.01)

(56) References Cited

U.S. PATENT DOCUMENTS

| | | | | |
|---|---|---|---|---|
| 2015/0373043 | A1* | 12/2015 | Wang | G06F 21/552 |
| | | | | 706/12 |
| 2018/0316727 | A1* | 11/2018 | Tsironis | H04L 63/20 |
| 2019/0005408 | A1* | 1/2019 | Tolpin | G06Q 30/06 |

* cited by examiner

Request for ATO Risk Assessment S210

Collecting Digital Event Data S220

Identifying ATO Risk Features S230

Evaluating ATO Risk Features S240

Generating ATO Risk Assessment S250

Collecting Feedback Data S260

FIGURE 2

SYSTEM AND METHODS FOR DIGITAL ACCOUNT THREAT DETECTION

CROSS-REFERENCE TO RELATED APPLICATIONS

This application is a continuation of U.S. patent application Ser. No. 15/842,379, filed on 14 Dec. 2017, which claims the benefit of U.S. Provisional Application Ser. No. 62/533,564, filed on 17 Jul. 2017, and U.S. Provisional Application Ser. No. 62/543,952, filed 10 Aug. 2017, which are incorporated herein in their entireties by this reference.

TECHNICAL FIELD

This invention relates generally to the digital fraud and abuse field, and more specifically to a new and useful system and method for detecting digital fraud or digital abuse in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
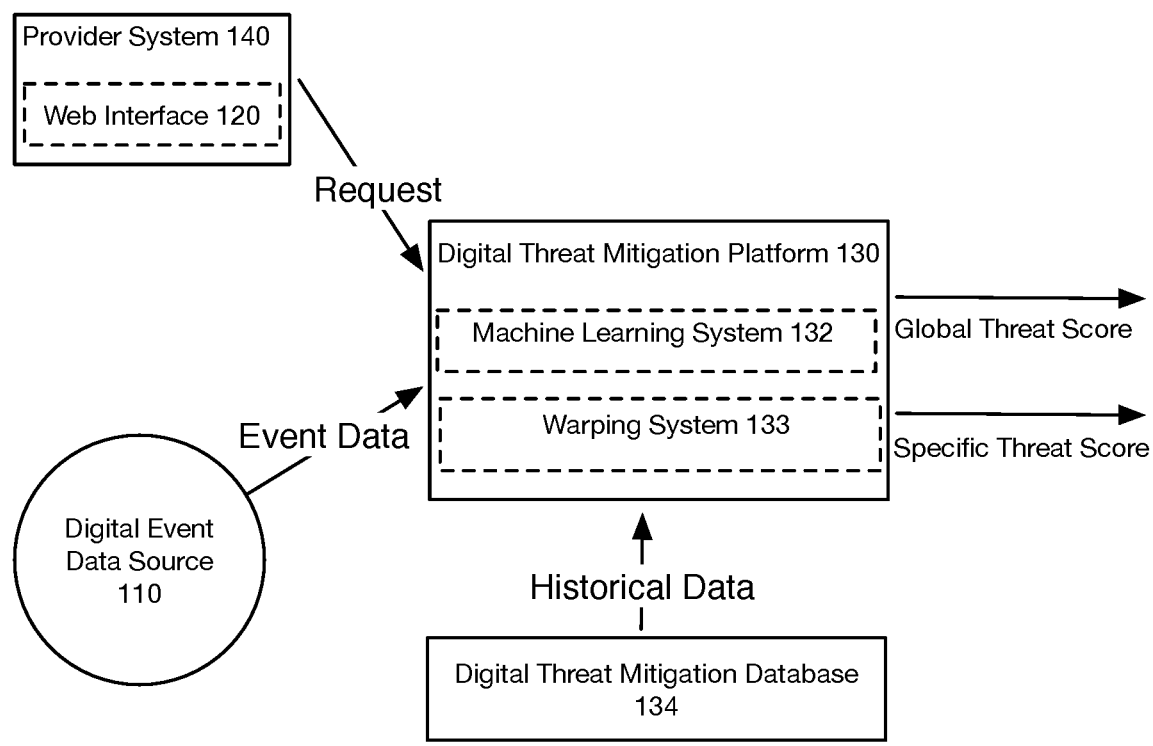
FIG. 1 illustrates a schematic representation of a system in accordance with one or more embodiments of the present application.
Figure 3:
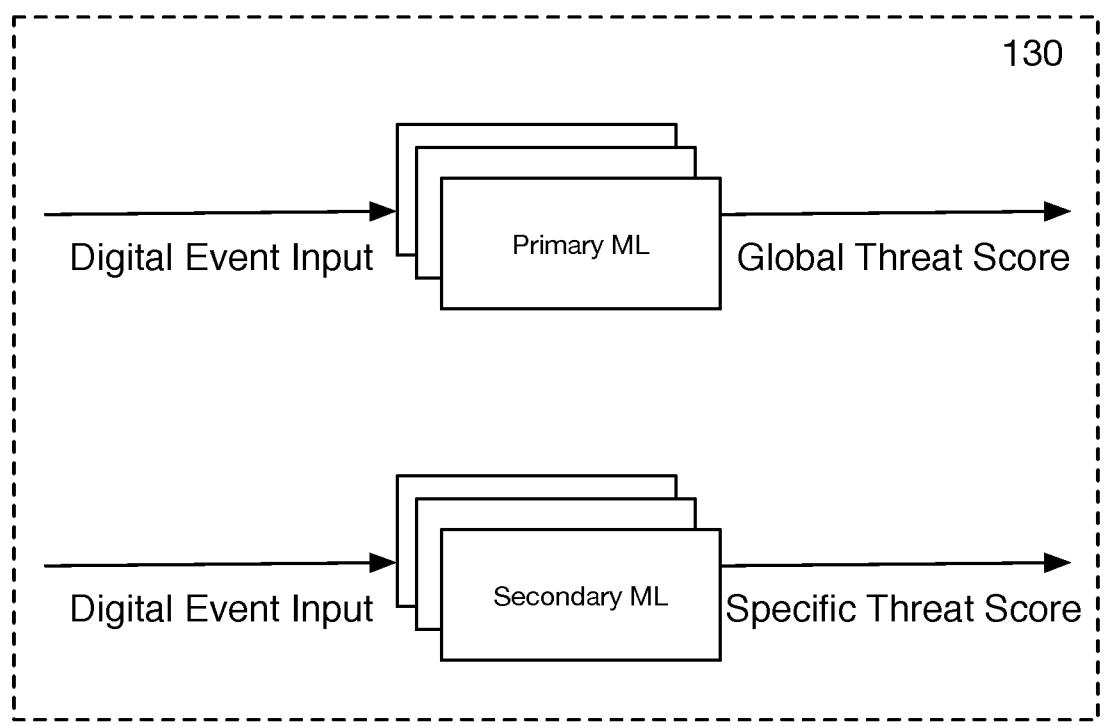
FIG. 3 illustrates an example schematic of a digital threat mitigation platform in accordance with one or more embodiments of the present application.
Figure 4:
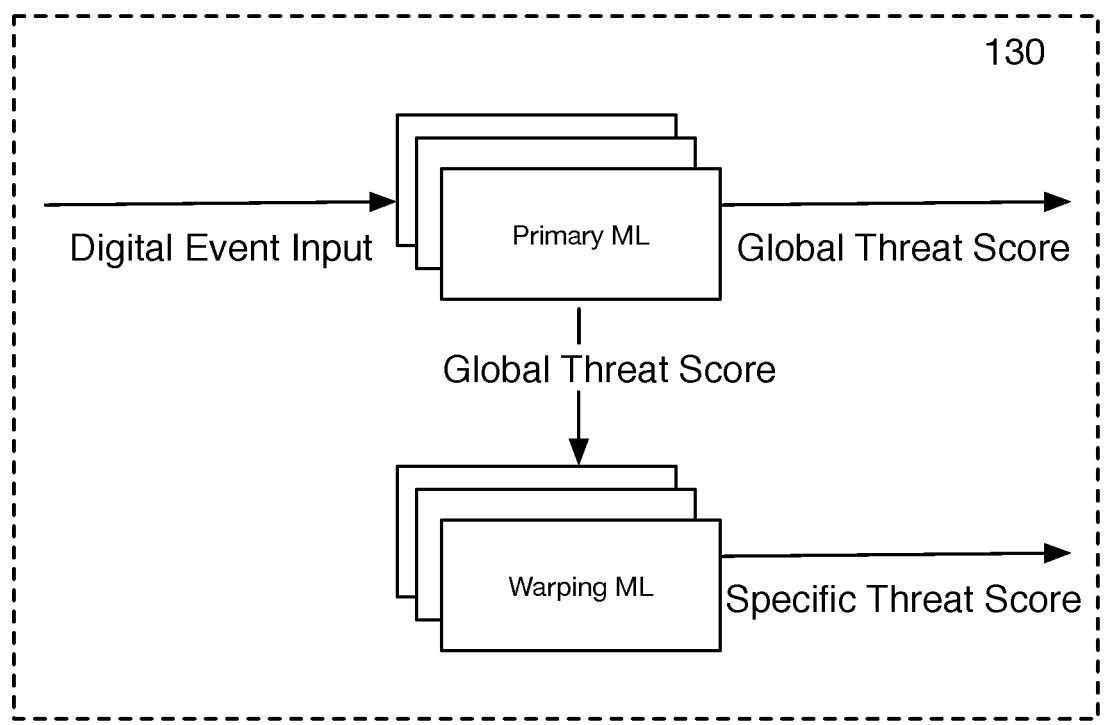
FIG. 4 illustrates an example schematic of a digital threat mitigation platform in accordance with one or more embodiments of the present application.
Figure 5:
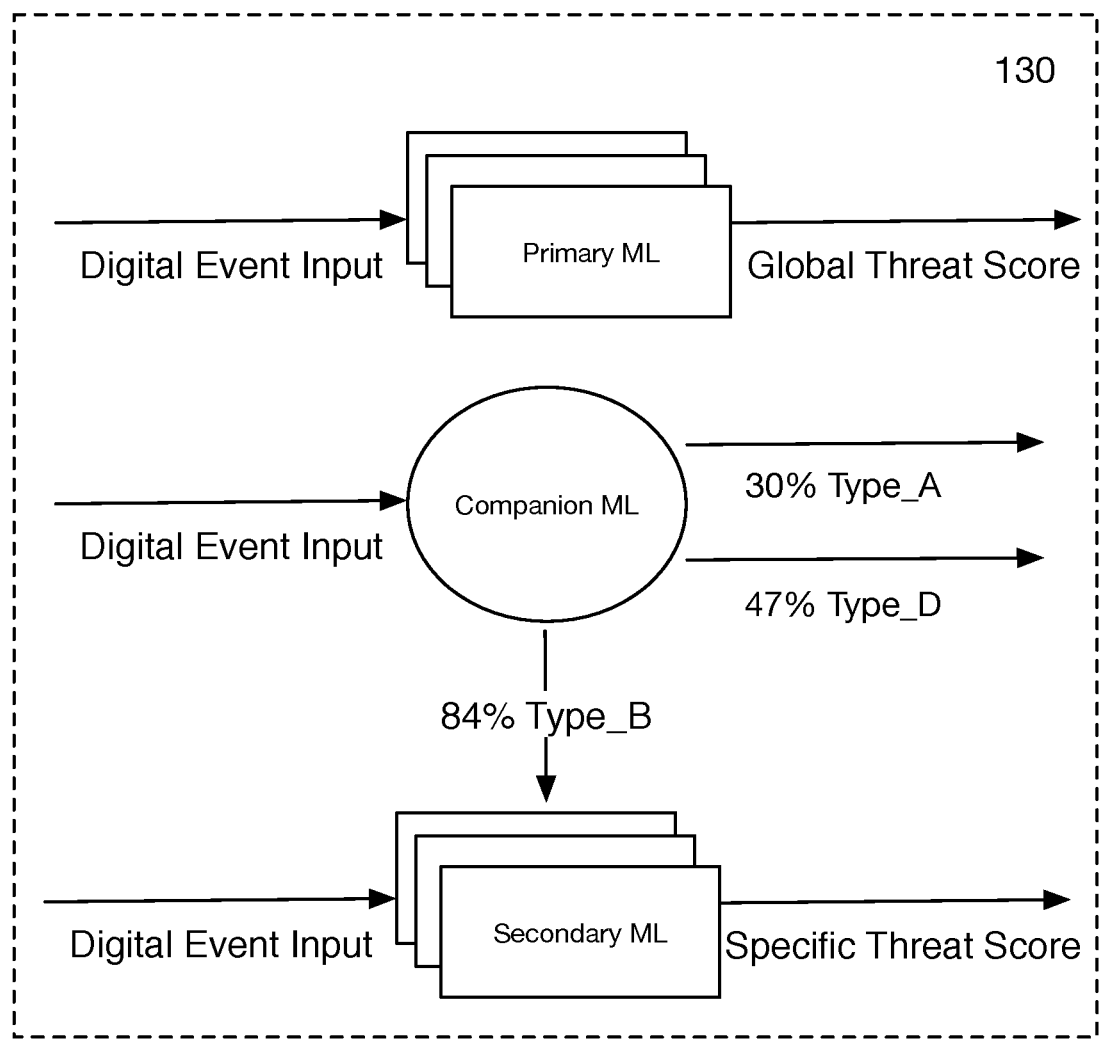
FIG. 5 illustrates an example schematic of a digital threat mitigation platform in accordance with one or more embodiments of the present application.
Figure 6:
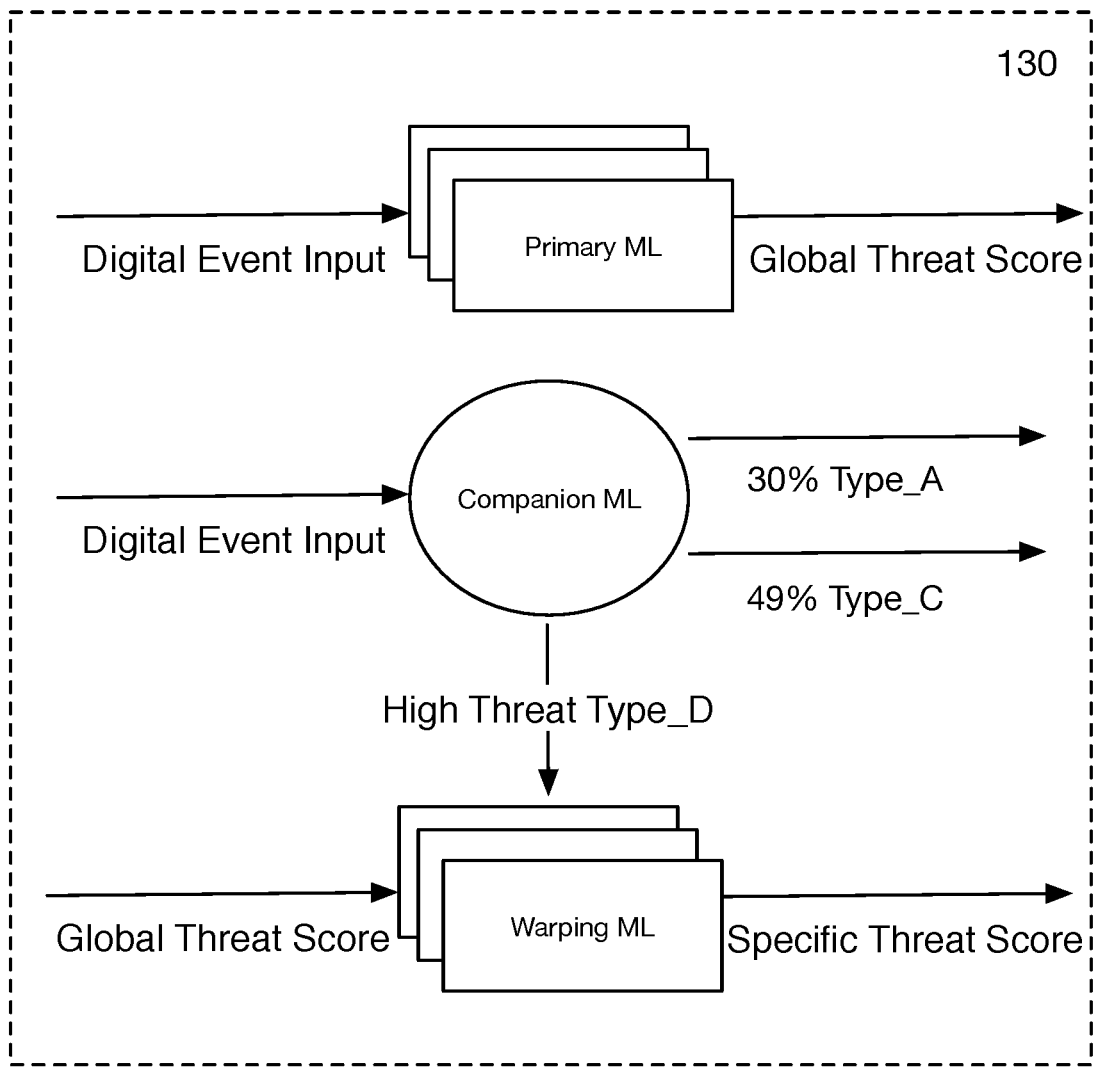
FIG. 6 illustrates an example schematic of a digital threat mitigation platform in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, from external (third-party) data sources, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application as well as described in U.S. application Ser. Nos. 15/653,354 and 15/653,373, which are both incorporated in their entireties by this reference, employ a robust ensemble of machine learning models and related systems that operate to ingest the great number of digital activities performed and events occurring over the web and parse from these great number of digital activities and events a subset of these activities and events that present the greatest likelihood of involving digital fraud and/or digital abuse. Accordingly, using these finely tuned and perpetually tunable machine learning models, a system implementing the several embodiments of the present application can predict and/or estimate with high accuracy and, in some embodiments, in real-time (e.g., as the event is occurring or shortly thereafter) a digital threat score for each event or activity that is sifted by the system.

The digital threat score may be exposed via a score application program interface (API) that may function to interact with various endpoints of the digital threat mitigation platform. Specifically, the score API may function to interact with one or more web computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

Additionally, recognizing that in some circumstances service providers that provide online and/or digital resources to users may need to mitigate or prevent multiple forms of digital fraud and/or digital abuse simultaneously, the embodiments of the present application enable the generation of a global digital threat score and a plurality of specific digital threat scores for varying, known digital fraud or abuse types. Accordingly, while the global digital threat score may indicate to the service provider a general indication of the existence of digital fraud and/or digital abuse in digital events data, the specific digital threat scores for the plurality of digital abuse types function to specifically identify a type of fraud or abuse that is being committed in a digital events dataset. These specific indications allow the service provider and/or the digital threat mitigation platform to implement digital threat mitigation or prevention actions that effectively address the specific digital fraud or abuse.

Account Takeover Overview

As alluded to in the foregoing section, digital threats and fraud threats are abound. A specific digital and fraud threat of significant concern includes an appropriation of control or access over a legitimate and/or good (digital) account by a malicious actor. This type of account takeover enables the malicious actor to manipulate the otherwise good account to perform fraudulent transactions and/or extract various types of value (e.g., misappropriating stored value, scamming other users, generating illegitimate content (spam), etc.).

The embodiments of the present application, however, enable a detection of a misappropriation of a legitimate (digital) account of a user by a malicious actor. Specifically, the embodiments of the present application function to collect account activity data associated with an account or a suspected hacked account to determine a likelihood that the account or suspected hacked account may be appropriated or accessed by a malicious actor. The likelihood determination (e.g., account takeover score or probability) by the embodiments of the present application may function to trigger one or more threat mitigation protocols (e.g., account restriction or lockdown, password reset, alerts to account owner, and the like) that enables the user and/or owner of the account to regain lawful control of a compromised account.

1. System for Digital Fraud and/or Abuse Detection

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables users to generate a request for a global digital threat score and additionally, make a request for specific digital threat scores for varying digital abuse types. After or contemporaneously with receiving a request from the web interface 120, the system 100 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources no may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to compute or extract features of the collected digital events data and digital activity data received from the one or more digital event data sources no. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify entities, digital activity, and/or event data to detect malicious entities, digital activities, and/or events using the computed and/or extracted features. The machine learning system 132 may additionally utilize the input from the one or more digital event data sources no and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores.

2. Method for Detecting Malicious Appropriation of a Digital Account

As shown in FIG. 2, the method 200 includes receiving a request for an account takeover (ATO) risk assessment of a digital account S210, collecting digital event (activity) data associated with the digital account S220, identifying one or more ATO risk features of the collected digital event data S230, evaluating the identified ATO risk features S240, generating an ATO risk assessment S250. The method 200 optionally includes collecting feedback data based on the ATO risk assessment via an events API S260.

The method 200 functions to detect a digital abuse type relating to the illegitimate accessing and/or takeover by a bad actor of an account (e.g., typically a good account) associated with a legitimate user. Based on a request by a service provider of the account, the method 200 functions to pull data about the account that may be relevant to a determination of a likelihood or risk level that the account may be compromised or otherwise, is at-risk to be compromised (e.g., taken over). Salient features of the collected data of the account may be sifted through one or more predetermined heuristics and/or risk filters that may trigger an indication or signal regarding a level or an amount of risk that the account will be or has been compromised by a bad actor. Thus, the method 200 enables a service provider or the like to intelligently and rapidly detect when an account has been compromised and has potentially been used by a bad actor thereby allowing the service provider to take one or more risk or threat mitigation steps to revert control of the account to the lawful user or owner or maintain the account in a good state.

S210, which includes receiving a request for an ATO risk assessment of a digital account, functions to receive via an API a request from a service provider for ATO risk assessment of a digital account of a user. The request for the ATO risk assessment may include input to specifically identify the digital account or may alternatively, include input to identify any or all accounts having (asynchronously-determined) specific risk levels. Accordingly, the service provider preferably initiates the request via a web API (e.g., a REST API or the like) accessible via one or more web-accessible computing servers of a digital threat mitigation platform implementing one or more portions of the method 200. It shall be noted, however, that any suitable web and/or graphical interface may be used to generate the request. Depending on contents of the request from the service provider, one or more digital threat detection and/or evaluation processes may be automatically triggered at the digital threat mitigation platform including one or more processes for generating an ATO risk assessment for a digital account.

Additionally, or alternatively, the request may function to trigger a synchronous response from a digital threat mitigation platform that may function to perform one or more steps of the method 200. Alternatively, a digital threat mitigation platform (e.g., of system 100) may function to asynchronously perform one or more steps of the method 200 including performing an ATO risk assessment and generating an ATO risk score or ATO risk level.

In some embodiments, the request for the ATO risk assessment may be triggered and generated automatically based on a coarse ATO score. A coarse ATO score typically relates to a broad ATO assessment of all or a majority of activities involving an account and a generated coarse ATO score identifies an overall or broad indication of an ATO risk of the account. By comparison, a specific ATO risk score may typically provide a measure of ATO risk based on specific interactive sessions or transaction sessions involving an account. As discussed in more detail below, the specific ATO risk assessment and score may be direct measures of ATO risk for one of a plurality of interactive sessions involving an account. For instance, if a coarse ATO score of a digital account satisfies or exceeds an ATO threat threshold, S210 may automatically trigger the generation of ATO risk assessments for specific interactive sessions of the digital account. In this way, it can be determined which, if any, of the historical or present specific interactive sessions of the digital account present an actionable ATO risk.

Additionally, or alternatively, the request for the ATO risk assessment may be a multipart request that includes a primary request for a latest coarse or overall ATO risk score of the digital account and a secondary request for the ATO risk assessment of a specific interactive session with the digital account. The coarse or overall ATO risk score of the digital account may typically relate to a generally likelihood or prediction regarding whether the account, itself, is at-risk of being compromised or has been compromised. The ATO risk assessment of a specific interactive session involving the digital account judges a risk level of illegitimate account appropriation during a period of use of the digital account. In a preferred embodiment, a beginning of a period or a session of use (e.g., an interactive session) of the digital account is typically determined based one or more login events involving the digital account in which a user successfully accesses (e.g., using correct account credentials, etc.) or logs into the digital account. Alternatively, a beginning of a period or a session of use of the digital account may be determined based on a use event (any type of use), which may include an activity or transaction that uses or involves the digital account (even if there is no login event). Additionally, or alternatively, a beginning of a period or an interactive session may include pre-login events, such as accessing a web page and browsing and/or interactive with a web page. Accordingly, beginning of a period of use or an interactive session may be triggered by any observable user-initiated digital activity. An end or termination of the interaction session of use of the account may be determined based on a performance or an attempted performance of a transaction (e.g., posting or attempting content, making or attempting a purchase, making or attempting a payment, etc.), one or more logout events, a lockout event, a passage of time between activities, a passage of time since last account activity, and the like. Any suitable signal or metric may be used to determine an end or termination of an interactive session of use of the digital account.

Additionally, or alternatively, the coarse ATO risk score may be generated using a general or specific machine learning model that is configured or designed to ingest all current and/or all historical transaction activity of the digital account to generate a coarse prediction about a state of compromise or risk of compromise of the digital account.

S220, which includes collecting digital event data associated with the digital account, functions to ingest digital events data and/or digital activity data associated with the digital account. In response to receiving the request for an ATO risk assessment of the digital account, S220 may function to collect digital event data from one or more data sources associated with the service provider making the request. Additionally, or alternatively, S220 may function to collect digital event data from a digital event databank or the like that includes digital event data from a plurality of different sources other than the service provider making the request.

In one variation of S220, contemporaneously or at a same time of making the request for the ATO risk assessment, the service providing making the request may transmit (e.g., via a network or the like), from one or more data repositories of the service provider to a system or digital threat platform performing the one or more steps of the method 200, the digital event data associated with the subject digital account. In some embodiments, the service provider transmits the digital event data immediately after making the request for the ATO risk assessment. The digital event data may be received at a machine learning server that preferably functions as an ATO features extractor and that may be specifically configured to ingest digital event data and one or more portions of the digital event data throughout the systems of a digital threat mitigation platform.

The collected digital event data from the one or more data sources associated with the service provider may include digital event data associated with events, actions, transactions, and various activities occurring via websites, mobile applications, and various digital resources associated with the service provider and/or accessible to a user having a digital account with the service provider. The collected digital event data may be structured and/or organized in a meaningful fashion to include metadata that describes the digital source(s) of the digital event data.

The collected digital event data may additionally include or be appended with user identification data such as data that identifies one or more users and/or one or more user accounts involved in the digital events and/or activities of the collected digital event data transmitted by the service provider. The user identification data may be used to identify and collect additional and/or historical user (or user account) data. Specifically, S220 may function to convert all or portions of the user identification data into queries for searching one or more database having additional and/or historical user data stored therein. The additional and/or historical user data may be specific to the one or more users and/or user accounts identified in the request from the service provider. Additionally, or alternatively, the additional and/or historical user data may be general digital event data about the users and user accounts of the service provider. The historical user data may be historical digital event data that was submitted in the past by the service provider making the request for the ATO risk assessment. That is, the historical user data may have been submitted with one or more historical requests by the service provider and stored in one or more databases associated with or maintained by a system implementing the method 200. Additionally, or alternatively, the historical user data may originate from other service providers that may have submitted digital event data to a system implementing the method 200 in the past.

The collected digital event data may include global digital event data acquired from a global digital event database. The global digital event database may include an aggregation of digital event data from a plurality of digital event sources. The plurality of digital event sources may include various other service providers. The global digital event data may be anonymized to prevent leakage of personally identifiable information. This additionally collected global event data may be considered assistive data that may be used as additional input into the machine learning classifier (e.g., an ATO feature extractor) of the system implementing the method 200 to improve the accuracy of the ATO feature extraction capabilities thereof.

The type and/or kind of global digital event data collected from the global digital event database may be defined based on the request for the ATO risk assessment of the digital account. Additionally, S220 may function to convert one or more portions of the request for the ATO risk assessment into probes that are sent into the global digital event data database to seek and retrieve digital event data that corresponds to or that is assistive in identifying or classifying ATO risk features.

S220 may additionally or alternatively convert one or more portions of the ATO risk assessment request into one or more queries for collecting the additional assistive digital event data in a similar manner as the one or more probes.

Accordingly, the collected digital event data may include digital event data originating directly from the service provider as well as global digital event data from other digital event sources (e.g., other service providers, etc.) and historical digital event data associated with one or more users or users' accounts associated with the request for the global digital threat score. The collected digital event data may additionally include data derived and/or generated by a system implementing the method 200 or any other suitable method executable by the system.

S230, which includes identifying one or more ATO risk features of the collected digital event data, functions to identify and extract from the collected digital event data ATO risk features that relate to or may be indicative of a potential malicious appropriation by a malicious party (e.g., a hacker, etc.) of the subject digital account.

In a preferred embodiment, S230 functions to implement an ATO risk features extractor for identifying and extracting ATO risk features from the collected data. In such preferred embodiment, the ATO risk features extractor may include a trained machine learning model or an ensemble of trained machine learning models that have been specifically trained to classify ATO risk features. The training process of the ATO risk features extractor may initially function to use one or more training algorithms to (randomly) generate feature weights, biases, and transfer functions for training the machine learning model based on inputs of samples of ATO risk features. The ATO risk features may be crowdsourced or otherwise, derived from a system implementing the method 200. The training process may implement any type of suitable training algorithm including, but not limited to, backwards propagation of errors, contrastive divergence, conjugate gradient methods, and/or any combination of the foregoing, and the like.

Preferably, the ATO risk feature extractor is configured to extract a minimum of three salient ATO risk features of the collected digital activity data that function to assist in determining an ATO risk assessment and/or ATO score. For instance, the ATO risk extractor may function to identify and extract a historical time series of session features or attributes. The session features or attributes may include internet protocol (IP) addresses of a device involved in the session, user agent data (e.g., a web browser, etc.) used to access the digital account and/or implement the session, cookies (e.g., an HTTP cookie, web cookie, browser cookie, etc.), and the like.

Additionally, the ATO risk feature extractor may function to identify and extract a number of logins (or login attempts) made with respect to the digital account. Specifically, the ATO risk feature extractor may function to identify the login or attempted login by the user and whether the login or attempted login was successful or a failure. Accordingly, S230 may use the ATO risk feature extractor to associate, link, or append as metadata a success or failure indication with each identified login or attempted login made with respect to the digital account.

S230 may additionally use the ATO risk feature extractor to identify and extract digital event times and/or timestamps for digital events involving the digital account. Specifically, S230 may use the ATO risk feature extractor to identify those digital events in which a user performed a notable action with the digital account (e.g., login, a purchase, a posting, value extraction, etc.). S230 may function to associate each identified event time or event timestamp to the associated digital event.

Preferably, each of the ATO risk features identifiable in S230 may be mapped to one or more of a plurality of ATO risk heuristics implemented in S240 to generate an ATO risk assessment. That is, in some embodiments, the features that the ATO risk feature extractor identifies and/or extracts from the collected digital event data are factors or features of one or more predetermined ATO risk heuristics. Thus, in some cases, it may be possible to configure the ATO risk feature extractor based on the features or factors of the plurality of ATO risk heuristics.

In a first implementation, the ATO risk features extractor implemented by S230 includes one trained (deep) machine learning model having a machine learning algorithm that is specifically trained to detect a plurality of disparate ATO risk features. Accordingly, S230 may function to aggregate the collected digital event data and pass the collected digital event data as input into the one trained machine learning algorithm of the ATO risk features extractor. Resultantly, the one trained machine learning algorithm may function to classify or identify within the collected data ATO risk features that may indicate a positive likelihood that a digital account may be compromised or may be at-risk to be compromised.

In a second implementation, S230 the ATO risk features extractor implemented by S230 includes an ensemble of trained (deep) machine learning models having a plurality of distinct machine learning algorithms that are specifically trained to detect a plurality of disparate ATO risk features. For instance, in one implementation, each of the plurality of distinct machine learning algorithms may be configured to detect and/or classify a specific ATO risk feature such that, in some embodiments, the ensemble of machine learning models includes a distinct and separate machine learning algorithm that may be used to classify a distinct and separate ATO risk feature. In some embodiments, two or more machine learning algorithms of the ensemble may be concerted together to detect an ATO risk feature.

In a third implementation, S230 may implement one or more ATO risk feature filters that function to filter from the collected digital activity data one or more ATO risk features. In such implementation, S230 may implement the one or more ATO risk feature filters in a multi-pass configuration in which the collected digital event data is passed through multiple or a series of the ATO risk feature filters. As the collected digital event data passes through or along the multi-pass configuration of filters, any identified ATO risk features may be immediately filtered (e.g., pulled, dropped, collected, flagged, etc.) by one or more of the respective ATO risk feature filters operating on the collected data.

The one or more ATO risk feature filters may be specifically configured and/or programmed to identify a predetermined list of ATO risk features and/or a list of ATO risk features derived from features or factors of a plurality of ATO risk heuristics.

In some embodiments, a combination of ATO risk feature filters and ATO risk feature classifying machine learning may be implemented by S230 to detect, classify, and extract ATO risk features from the collected data. For instance, S230 may implement the one or more ATO risk feature filters at a first stage of a multi-stage feature extraction process. In the first stage, the one or more ATO risk feature filters may function to extract common, high-level, and generally more easily identifiable ATO risk features of the collected data. S230 may then function to passed the collected data through a second stage that involves an ATO risk feature extractor implementing one or more machine learning models that functions to identify complex ATO risk features that may generally be more difficult to identify using preprogrammed filters or the like.

Additionally, or alternatively, S230 may function to store the extracted ATO risk features in a risk features database in association with data of the request for the ATO risk assessment.

S240, which includes evaluating the identified ATO risk features, functions to evaluate the identified ATO risk features of the collected digital event data of the digital account against a plurality of ATO risk heuristics. Specifically, S240 may implement an ATO risk model that is defined by at least the plurality of ATO risk heuristics. Accordingly, the ATO may function as a heuristics-based classifier that functions to classify or predict a risk level based on identified ATO risk features. Additionally, or alternatively, the ATO risk model may also include a set of predetermined ATO risk rules that may be applied in conjunction with or in lieu of one or more of the plurality of ATO risk heuristics.

In use, S240 may function to pass through the ATO risk model one or more sets or subsets of the extracted ATO risk features of the collected digital event data to identify which, if any, of the ATO risk heuristics may be triggered by the identified ATO risk features. In particular, an ATO risk heuristic may be triggered if the identified ATO risk features of the collected digital event data matches or exceeds a selected ATO risk heuristic.

Additionally, or alternatively, an ATO risk heuristic may be partially triggered by a set or subset of ATO risk features when the set or subset of ATO risk features only partially matches criteria of an ATO heuristic. In such embodiments, a partial match and resultantly, a partial trigger of an ATO risk heuristic may be based on values of the ATO risk features satisfying or exceeding a partial match threshold but not reaching a full (or 100% match or better) with the ATO risk heuristic. S240 may function to use or further evaluate a partial trigger of an ATO heuristic when or if a related or other ATO heuristic is triggered or partially triggered by the ATO risk features. That is, while a partial trigger, alone, may be insufficient to trigger a determination of an ATO risk level or an ATO risk score, a combination of partial trigger of multiple ATO risk heuristics or a combination of a partially triggered ATO risk heuristic and a fully triggered ATO risk heuristic may be sufficient to generate or determine ATO risk levels and/or ATO risk scores.

Additionally, each one of the plurality of ATO heuristics of the ATO risk model may be mapped or linked to a specific risk level or risk score component. That is, once an ATO risk heuristic is triggered by an evaluation by the ATO risk model of ATO risk features, S240 functions to follow a mapping from the triggered ATO risk heuristic to identify a specific ATO risk level or ATO risk score associated with the triggered ATO risk heuristic.

In some embodiments, S240 may additionally function to identify specific and/or predetermined combinations of triggered ATO risk heuristics that together present a high probability of malicious appropriation of a digital by a bad actor. A high probability of malicious appropriation of a digital account typically refers to a combination of ATO risk levels and/or ATO risk scores that satisfies or exceeds a critical ATO risk threshold. For example, if a combination of a geolocation ATO risk heuristic, devices ATO risk heuristic, and an IP address ATO risk heuristic are triggered, the combination of their collective ATO risk levels may exceed the critical ATO risk threshold thereby triggering an alert of high ATO risk to a service provider and/or legitimate owner of the digital account.

The ATO risk levels may range between any two values (e.g., 0-10, A-E, and the like), any range of non-numerical indicators or characters (e.g., Green to Yellow to Red, low to intermediate to high, etc.), and the like. Accordingly, an ATO risk level or an ATO risk score may be represented in any suitable differentiated manner. Additionally, the ATO risk levels and/or the ATO risk scores assigned to each ATO risk heuristic may be generated by a machine learning model that functions to suggest or predict appropriate ATO risk levels or ATO risk scores for each of the plurality of ATO heuristics. Alternatively, the ATO risk levels and/or the ATO risk scores assigned to each ATO risk heuristic may be generated based on any suitable statistical model or statistical technique.

Additionally, or alternatively, the risk levels attributed to an ATO risk heuristic may be escalated based on a triggering of prior or another ATO risk heuristic. For instance, in some embodiments, as a respective ATO risk heuristic is triggered by one or more ATO risk features, the ATO risk level and/or ATO risk score assigned to other ATO risk heuristics (e.g., un-triggered ATO risk heuristics) may be incremented higher such that an initial value of an ATO risk level or an ATO risk score is made to a higher or successive value. For example, an ATO risk level mapped to a second ATO risk heuristic may be two (2) out of a total of ten (10) (assuming that a lower value means a lower ATO risk). Upon the triggering of a first ATO risk heuristic, S240 may increment higher the value of the ATO risk level mapped to the second ATO risk heuristic to four (4) out of a total of ten (10). In such example, if the second ATO risk heuristic is subsequently triggered by the ATO risk features, S240 may function to generate a new ATO risk level of four (4) to the second ATO risk heuristic thereby incrementing the ATO risk level higher.

The escalation of ATO risk levels or ATO risk scores of ATO heuristics generally enables a system implementing the method 200 to identify a potential account takeover more efficiently as it may be more likely that a digital account having multiple triggered ATO risk heuristics is compromised or has a relatively high risk of being compromised when compared to digital accounts with one or less triggered ATO risk heuristics.

The method 200 preferably functions to implementing a plurality of ATO risk heuristics including: an ATO risk heuristic that identifies suspicious logins (e.g., based on login frequency or location of login); an ATO risk heuristic that identifies suspicious account updates (e.g., unknown shipping address updated to digital account, etc.); an ATO risk heuristic that identifies suspicious or multiple devices accessing the digital account (e.g., unknown devices, not previously used devices, etc.), an ATO risk heuristic that identifies suspicious or unknown IP addresses (e.g., IP addresses not historically used by legitimate account owner, etc.), geolocation ATO risk heuristic that identifies foreign physical locations of a user accessing or using the digital account, and the like. The above-enumerated list is merely a non-limiting example and non-exhaustive list of some of the ATO risk heuristics that may be used in detecting malicious appropriation of a digital account and should not be interpreted to limit the scope of ATO risk heuristics that may be completed and/or operated by the embodiments of the present application.

Additionally, or alternatively, S240 may function to evaluate ATO risk behaviors or ATO risk incidents in addition or in lieu of evaluating ATO risk features. In some embodiments, S240 may function to evaluate ATO risk behaviors for a digital account that includes collecting a portion of or a full history user activity data and/or digital event activity of a digital account and developing one or more normal behavioral patterns based on the collected data. S240 may function to use the determined normal behavior patterns for a digital account as an ATO risk detection mechanism by collecting user activity and/or digital event activity data for one or more sessions implemented using a digital account and comparing the activity data of the one or more sessions to the normal behavior patterns. Thus, enabling S240 to detect (minor or significant) deviations from normal behavior for the digital account.

As mentioned above, S240 may additionally function to evaluate ATO risk incidents that are potentially indicative of potential malicious appropriation of a digital account. ATO risk incidents are events or incidents involving a digital account that does not squarely fit or match an ATO risk heuristic but may have some indicative value of ATO risk. For instance, an ATO risk incident may include a detection of a negative community signal for an account that has historical had positive community signals. In such instance, a digital account which may have been historically reviewed positively by a community of users may collect one or more highly negative reviews (unlike the historically positive reviews) from the community of user, which may signal an account takeover by a malicious party.

S250, which includes generating an ATO risk assessment, functions to construct an ATO risk response that includes the ATO risk assessment for the digital account. Specifically, S250 may function to collect the ATO risk outputs of S240 and convert the ATO risk outputs to a comprehensible ATO risk assessment for the digital account. In particular, S250 may function to generate an ATO risk assessment for a specific interactive session with the digital account. Additionally, or alternatively, S250 may function to generate an ATO risk assessment for risk state of the digital account, itself, rather than a specific interactive session.

In generating the ATO risk assessment for a specific interactive session of a digital account, S250 may function to collect the ATO risk levels or scores identified based on associated ATO risk levels or scores for triggered ATO risk heuristics and use the ATO risk levels or scores to generate an overall ATO risk assessment for a specific interactive session. In some embodiments, the resulting ATO risk assessment is represented as a numerical value or character value; alternatively, the ATO risk assessment may be represented with natural language terms, such as Ok, neutral, or bad. It shall be noted that the ATO risk assessment may be represented in any suitable manner.

Accordingly, S250 may function to generate the ATO risk assessment based on an aggregate of the identified risk assessment levels or scores for a specific interactive session of the digital account. For a given interactive session, for instance, three ATO risk scores of 3, 7, and 2 may be added together for a total ATO risk score of 12 for a specific interactive session. In some embodiments, the aggregated total ATO risk score may be divided by the total number of ATO risk heuristics that were triggered (e.g., 3 triggered ATO risk scores resulting in (12/3)=4 average ATO risk score.

Additionally, or alternatively, S250 may function to weigh ATO risk scores distinctly based on the ATO risk heuristic that was triggered and aggregate the ATO risk scores after applying weightings to the ATO score for a specific interactive session. For instance, a first ATO risk score may have a 70% weighting of a total ATO risk assessment or score and a second ATO risk score may have a 30% weight of a total ATO risk assessment.

Additionally, or alternatively, S250 may function to link each generated ATO risk assessment to a respective interactive session for a digital account. Accordingly, S250 may generate a report and return the report via an intelligent API that illustrates a list of interactive sessions for a digital account together with corresponding ATO risk assessments, where each distinct ATO risk assessment may be digitally linked to one of the list of interactive sessions. In this way, a user or service provider may interact with ATO risk scores for specific interactive sessions of a digital account and perform additional discovery and/or investigations. Additionally, or alternatively, the intelligent API may enable a user or service provider to specifically select an interactive session and/or ATO risk assessment and perform one or more ATO risk mitigation processes (e.g., disable an active interactive session with an adverse ATO risk assessment, perform user verification to ensure that the user of the interactive session is the legitimate owner (e.g., via two-factor authentication, or other identity/authority verification processes).

In some embodiments, S250 may function to perform one or more automatic actions based on a determined ATO risk assessment for an interactive session. For instance, if an ATO risk assessment exceeds one or more predetermined ATO risk thresholds, S250 may function to flag the digital account for review, send an immediate ATO risk alert to the service provider, propose to the service provider one or more restrictive actions towards the session (e.g., disable session or account access for a period), automatically cancel transactions during an interactive session, and/or the like.

Optionally, S260, which includes collecting feedback data based on the ATO risk assessment via an intelligent API, functions to enable a service provider to provide feedback regarding the ATO risk assessments for interactive sessions for a digital account. Specifically, the intelligent API may request a confirmation or denial from the service provider regarding the accuracy of the ATO risk assessment for a specific interactive session. The feedback received via the intelligent API may be linked to the session to improve one or more aspects of the ATO risk assessment generation processing including returning the one or more ATO risk heuristics that were triggered by an interactive session.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A system for identifying malicious appropriation or malicious access of an online account, the system comprising:
an application programming interface that is in operable communication with a remote digital threat mitigation platform and that is configured to generate an API request to the remote digital threat mitigation platform for an account takeover (ATO) risk score for an activity session involving the online account;
the remote digital threat mitigation platform being implementing with one or more computing servers that receive, via a communication network, the API request for the ATO risk score and in response to receiving the API request for the ATO risk score, performs:
collecting digital event data associated with the online account;
implementing an ATO feature extractor comprising a machine learning classifier that is trained to classify a plurality of disparate ATO features from the collected digital event data and extract ATO features that signal a positive likelihood of an existence of malicious activity in the activity session involving the online account; and
implementing an ATO classifier that evaluates a plurality of distinct ATO heuristics based on inputs of the ATO features extracted from the collected digital event data and classifies which of the plurality of distinct ATO heuristics is triggered by the ATO features, wherein evaluating the plurality of distinct ATO heuristics includes mapping each of the ATO features to one or more distinct ATO heuristics of the plurality of distinct ATO heuristics;
identifying the one or more distinct ATO heuristics of the plurality of distinct ATO heuristics with a mapping to at least one of the ATO features;
identifying one or more distinct ATO risk levels based on a mapping of each of the identified one or more distinct ATO heuristics to each of a plurality of distinct ATO risk levels;
computing the ATO risk score for the activity session involving the online account based on the identified one or more distinct ATO risk levels, wherein the ATO risk score indicates a likelihood that the activity session involving the online account is a result of malicious appropriation or malicious access of the online account; and
returning, via the API, the ATO risk score thereby enabling an online service provider associated with the online account to perform one or more of automatically requesting user verification, approving, holding, and cancelling an activity or an online transaction associated with the activity session if the ATO risk score satisfies an ATO threat threshold.

2. The system according to claim 1, wherein
in response to returning the ATO risk score, automatically implementing user verification that ensures that a user associated with the activity session is a legitimate owner of the online account.

3. The system according to claim 1, wherein
in response to returning the ATO risk score, implementing one or more account takeover mitigation protocols including one or more of restricting an operation of the online account, modifying access controls of the online account, locking down the online account, deny, hold, or approve an activity or a transaction associated with the one or more digital events if the ATO risk score satisfies an ATO threat threshold.

4. The system according to claim 1, wherein
the remote digital threat mitigation platform additionally performs:
   evaluating a plurality of distinct activity sessions involving the online account including using the ATO classifier to evaluate the plurality of distinct ATO heuristics based on inputs of ATO features extracted from the plurality of distinct activity sessions;
   computing a distinct ATO score for each of the plurality of distinct activity sessions based on the evaluation; and
   presenting a listing of each of the plurality of distinct activity sessions that links a respective distinct ATO score with each of the plurality of distinct activity sessions together with a listing of the distinct ATO heuristics forming a basis of the respective distinct ATO score.

5. The system according to claim 1, wherein:
computing the ATO risk score for the activity session includes applying a distinct weight value to each of the identified one or more distinct ATO risk levels; and
computing the ATO risk score is based on the weight value associated with each of the one or more distinct ATO risk levels.

6. The system according to claim 1 further comprising:
a machine learning system that:
   uses the collected digital event data, as input, into a machine learning ensemble to generate a global digital threat score for the online account separate from the ATO risk score for the activity session of the online account.

7. The system according claim 1, wherein:
the ATO risk score computed for the activity session of the online account identifies a level of illegitimate online account appropriation during a defined period of use of the online account.

8. The system according to claim 1, wherein:
a beginning of a period defining the activity session is defined by a detected online log-in event by a user;
collecting the digital event data includes collecting digital event data generated during the period of the activity session; and
implementing the ATO feature extractor includes extracting ATO features only from the digital event data generated during the period of the activity session.

9. The system according claim 8, wherein:
a termination of the period defining the activity session of the online account is defined by one or more of:
   a logout event involving the online account, a performance or an attempted performance of a transaction with the online account, a lockout event from the online account, a passage of time since account activity, generating content, exchange of data, and a passage of time between account activities.

10. The system according to claim 1, wherein:
the ATO feature extractor operates to identify and extract from the collected digital activity data, at least, (1) historical time series of session features or attributes, (2) one or more internet protocol (IP) addresses of devices used to access the online account, and (3) user agent data involved in accessing the online account.

11. The system according to claim 1, wherein:
the ATO feature extractor comprises a plurality of ATO feature filters, wherein each of the plurality of ATO feature filters operates to filter from the collected digital event data a specific type of ATO feature of the one or more ATO features.

12. A method of identifying malicious appropriation and/or malicious access of an online account, the method comprising:
implementing an application programming interface that is in operable communication with a remote digital threat mitigation service and that is configured to generate an API request to the remote digital threat mitigation service for an account takeover (ATO) risk score for an activity session involving the online account;
at a remote digital threat mitigation service implemented by one or more computing servers that receive, via a communication network, the API request for the ATO risk score:
   collecting digital event data associated with the online account;
   implementing ATO feature extractors for a machine learning classifier that is trained to classify a plurality of disparate ATO features from the collected digital event data and extract ATO features that signal a positive likelihood of an existence of malicious activity in the activity session involving the online account; and
   implementing an ATO classifier that evaluates a plurality of distinct ATO heuristics based on inputs of the ATO features extracted from the collected digital event data and classifies which of the plurality of distinct ATO heuristics is triggered by the ATO features, wherein evaluating the plurality of distinct ATO heuristics includes mapping each of the ATO features to one or more distinct ATO heuristics of the plurality of distinct ATO heuristics;
   identifying the one or more distinct ATO heuristics of the plurality of distinct ATO heuristics with a mapping to at least one of the ATO features;
   identifying one or more distinct ATO risk levels based on a mapping of each of the identified one or more distinct ATO heuristics to each of a plurality of distinct ATO risk levels;
   computing the ATO risk score for the activity session involving the online account based on the identified one or more distinct ATO risk levels, wherein the ATO risk score indicates a likelihood that the activity session involving the online account is a result of malicious appropriation or malicious access of the online account; and
   returning, via the API, the ATO risk score thereby enabling an online service provider associated with the online account to perform one or more of automatically requesting user verification, approving, holding, and cancelling an activity or an online transaction associated with the activity session if the ATO risk score satisfies an ATO threat threshold.

13. The method according to claim 12, further comprising:
automatically implementing user verification that ensures that a user associated with the activity session is a legitimate owner of the online account based on the ATO risk score.

14. The method according to claim 12, further comprising:
implementing one or more account takeover mitigation protocols including one or more of restricting an operation of the online account, modifying access controls of the online account, locking down the online account, deny, hold, or approve an activity or a transaction associated with the one or more digital events if the ATO risk score satisfies an ATO threat threshold.

15. The method according to claim 12, wherein:
computing the ATO risk score for the activity session includes applying a distinct weight value to each of the identified one or more distinct ATO risk levels; and
computing the ATO risk score is based on the weighted distinct ATO risk levels.

16. The method according to claim 12 further comprising:
a machine learning system that:
uses the collected digital event data, as input, into a machine learning ensemble to generate a global digital threat score for the online account separate from the ATO risk score for the activity session of the online account.

17. The method of claim 12, wherein:
a beginning of a period defining the activity session of the online account is defined by a time associated with anonymous page activities observed prior to a login event with respect to the online account.

18. A non-transitory computer program product storing computer-executable instructions, that when executed by one or more computer processors, performs the steps of:
collecting digital event data associated with the online account;
implementing ATO feature extractors for a machine learning classifier that is trained to classify a plurality of disparate ATO features from the collected digital event data and extract ATO features that signal a positive likelihood of an existence of malicious activity in the activity session involving the online account; and
implementing an ATO classifier that evaluates a plurality of distinct ATO heuristics based on inputs of the ATO features extracted from the collected digital event data and classifies which of the plurality of distinct ATO heuristics is triggered by the ATO features, wherein evaluating the plurality of distinct ATO heuristics includes mapping each of the ATO features to one or more distinct ATO heuristics of the plurality of distinct ATO heuristics;
identifying the one or more distinct ATO heuristics of the plurality of distinct ATO heuristics with a mapping to at least one of the ATO features;
identifying one or more distinct ATO risk levels based on a mapping of each of the identified one or more distinct ATO heuristics to each of a plurality of distinct ATO risk levels;
computing the ATO risk score for the activity session involving the online account based on the identified one or more distinct ATO risk levels, wherein the ATO risk score indicates a likelihood that the activity session involving the online account is a result of malicious appropriation or malicious access of the online account; and
returning, via an application programming interface, the ATO risk score thereby enabling an online service provider associated with the online account to perform one or more of automatically requesting user verification, approving, holding, and cancelling an activity or an online transaction associated with the activity session if the ATO risk score satisfies an ATO threat threshold.

19. The non-transitory computer program product according to claim 18, further comprising:
implementing one or more account takeover mitigation protocols including one or more of restricting an operation of the online account, modifying access controls of the online account, locking down the online account, deny, hold, or approve an activity or a transaction associated with the one or more digital events if the ATO risk score satisfies an ATO threat threshold.

20. The non-transitory computer program product according to claim 18, wherein:
computing the ATO risk score for the activity session includes applying a distinct weight value to each of the identified one or more distinct ATO risk levels; and
computing the ATO risk score is based on the weighted distinct ATO risk levels.

* * * * *